Figure 1:
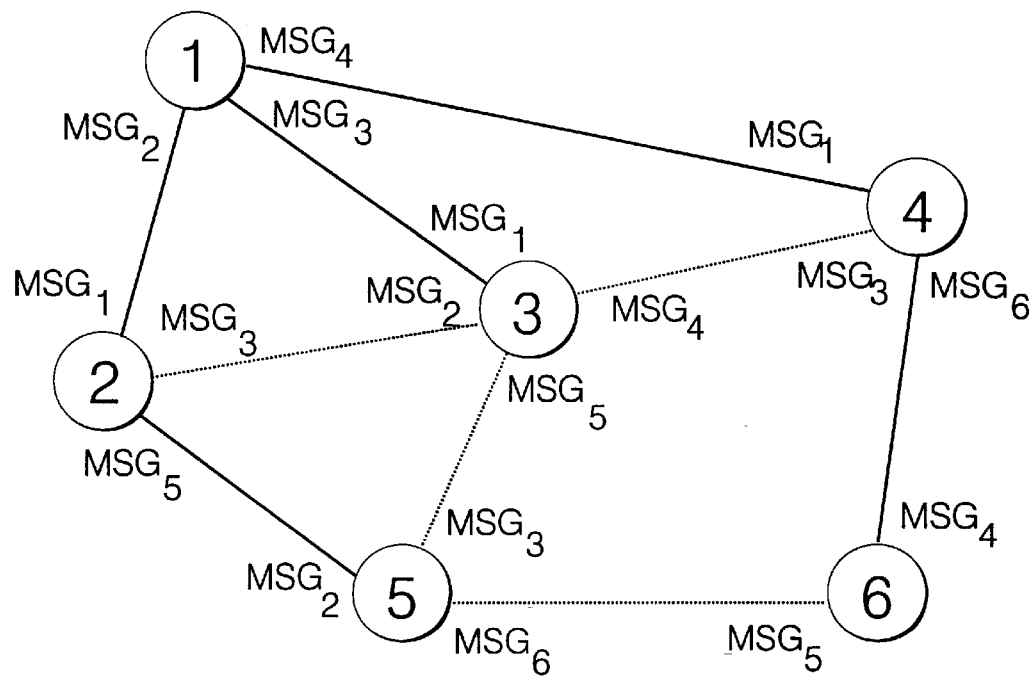

United States Patent [19]

Kainulainen

[11] Patent Number: 5,838,659
[45] Date of Patent: Nov. 17, 1998

[54] HIERARCHICAL SYNCHRONIZATION METHOD

[75] Inventor: Jukka Kainulainen, Helsinki, Finland

[73] Assignee: Nokia Telecommunications Oy, Espoo, Finland

[21] Appl. No.: 693,163

[22] PCT Filed: Feb. 28, 1995

[86] PCT No.: PCT/FI95/00111

§ 371 Date: Aug. 14, 1996

§ 102(e) Date: Aug. 14, 1996

[87] PCT Pub. No.: WO95/24800

PCT Pub. Date: Sep. 14, 1995

[30] Foreign Application Priority Data

Mar. 1, 1994 [FI] Finland ..................................... 940978

[51] Int. Cl.$^6$ ....................................................... H04J 3/06
[52] U.S. Cl. ........................... 370/216; 370/503; 375/356; 375/357
[58] Field of Search ....................................... 375/356, 357, 375/359; 370/507, 503, 511, 512, 513, 514, 216, 248, 217, 218

[56] References Cited

U.S. PATENT DOCUMENTS

| | | |
|---|---|---|
| 2,986,723 | 5/1961 | Darwin et al. . |
| 4,837,850 | 6/1989 | Maisel et al. . |
| 5,386,418 | 1/1995 | Komuro et al. .......................... 375/356 |
| 5,475,717 | 12/1995 | Cordonnier et al. ..................... 375/356 |
| 5,577,075 | 11/1996 | Cotton et al. ............................. 375/356 |
| 5,696,799 | 12/1997 | Kainulainen ............................. 375/356 |
| 5,706,291 | 1/1998 | Kainulainen et al. ................... 370/503 |
| 5,734,687 | 3/1998 | Kainulainen ............................. 375/357 |

FOREIGN PATENT DOCUMENTS

94/11964  5/1941  WIPO .
87/00369  1/1987  WIPO .

*Primary Examiner*—Chau Nguyen
*Assistant Examiner*—Kenneth Vanderpuye
*Attorney, Agent, or Firm*—Pillsbury Madison & Sutro LLP

[57] ABSTRACT

A method of hierarchical synchronization for a telecommunications system employing message-based synchronization, the system having a plurality of nodes interconnected by transmission lines, wherein the nodes interchange signals containing synchronization messages each having a synchronization signature indicating a priority of the corresponding signal in an internal synchronization hierarchy of the system, and wherein a node is forced to enter into a predetermined standard state in a change situation in order to prevent the selection of faulty synchronization messages. The method includes, in a change situation, the node entering into a state of forced timing where it has selected a synchronization signature received from a neighboring node and synchronized itself with a clock frequency of a signal from the neighboring node, and upon transition to the state of forced timing, measuring a time period with a timer, and then, after expiry of the time period, the node entering into a state of normal timing, and when the selected synchronization signature changes while in said state of forced timing, accepting the signature, and restarting measurement of the time period of the forced state, and when a quality of the signal corresponding to the selected synchronization signature becomes inadequate for synchronization, the node entering into the predetermined standard state in order to prevent the selection of a faulty synchronization signature, and restarting the measuring of the time period of the forced state, wherein a transition is performed at least whenever a signal is received from said neighboring node through only one transmission line.

7 Claims, 7 Drawing Sheets

HIERARCHICAL SYNCHRONIZATION METHOD

The invention relates to hierarchical synchronization methods according to the preambles of the appended claims 1 and 6, the methods being used in a telecommunications system employing message-based synchronization.

In this presentation, the junction points of the transmission lines in a system are called nodes. A node may be any device or equipment capable of affecting clock synchronization, such as a branching or cross-connection means.

Nodes in a system utilizing message-based synchronization are interconnected by transmission lines which the nodes use for data transmission. These lines also forward the clock frequency of the transmitting party to the receiving party. Each node selects as the source-of its own clock frequency either the frequency of a signal from a neighboring node, the frequency of its own internal clock source, or a frequency brought into the node from an external clock source through a separate synchronization input. In order that all nodes in the system would operate at the same clock frequency, the aim is usually to make the system synchronize itself with a single clock source called a master source. All system nodes connected directly to the selected master source are thus synchronized with the master source while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy could be established within the system, the system nodes interchange synchronization messages. These messages contain information by means of which individual nodes are able to select a timing source. The system nodes are prioritized and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighboring clock frequency which originates from a desired node and which is of the highest quality can be selected by an individual node as the source of its own clock frequency.

At the system start-up each node selects its own internal clock source as the source of its clock frequency as it has not yet processed any incoming synchronization messages. After the node has processed the first incoming synchronization messages, it selects the clock frequency of a neighboring node having the highest level of priority as the source of its clock frequency. After all messages have been distributed over the system and the system has achieved a stable state as far as synchronization is concerned, the system has been synchronized hierarchically with the clock frequency of the master source.

FIG. 1 shows a system utilizing message-based synchronization in a stabilized situation. Priorities assigned to the nodes are indicated by numbers within the circles representing the nodes. The smaller the number, the higher the priority of the node. Synchronization messages transmitted by a node n (n=1 . . . 6) are indicated by the reference MSGn. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Figure 2:
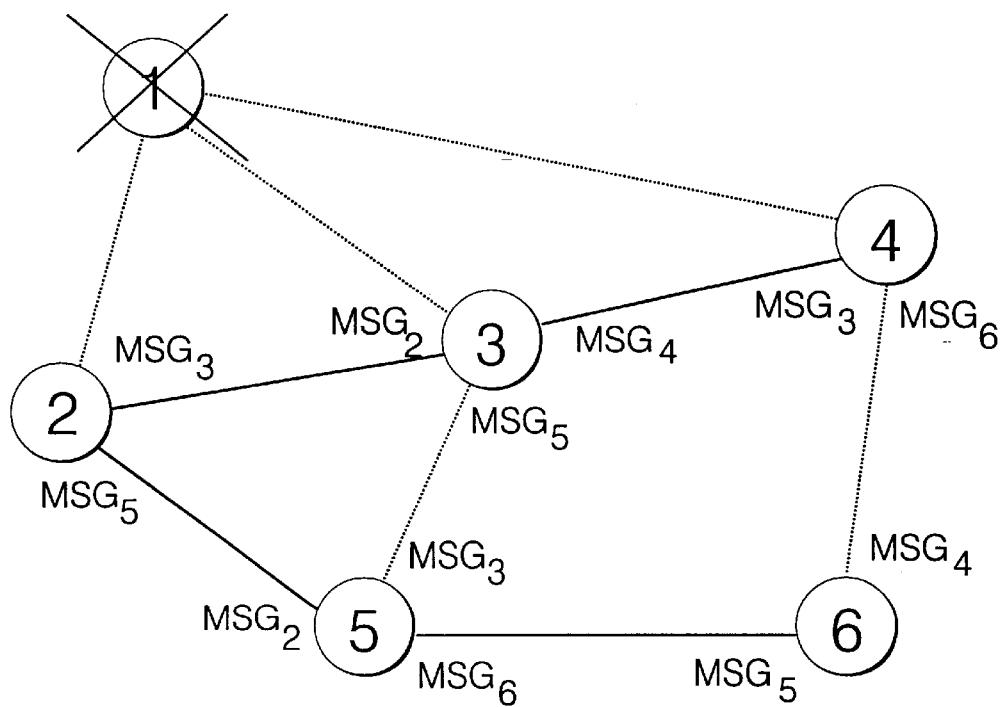

Message-based synchronization is based on a simple principle that the user defines the synchronization hierarchy of the system nodes by assigning each node a dedicated signature indicating the hierarchical level of the node and the system synchronizes itself with the defined master clock independently by utilizing, if required, all existing internodal connections (cf. FIG. 1). If the connection to the master clock breaks, and no alternative connection exists, or if the master clock fails, the system synchronizes itself with a node of the next highest level of hierarchy. FIG. 2 shows-a situation where the master clock fails in the system according to FIG. 1. Response to the change in synchronization takes place by message interchange between nodes. When the timing source of the node fails, the synchronization hierarchy is reestablished beginning from the point of break (away from the master device of the system). This takes place e.g. in such a manner that the node that detects the break first enters into a state of internal timing for a preset time period and then forwards information about the change, thus leading to a new synchronization hierarchy being formed. The resulting hierarchy is usually similar to the original hierarchical structure where the failed connection is replaced with an operative one while the structure otherwise remains nearly unchanged.

A network utilizing message-based synchronization is described e.g. in U.S. Pat. Nos. 2,986,723 and 4,837,850. Both patents disclose methods in which time periods depending on the size and configuration of the system are used in the case of system failures. During the time periods the nodes are in a predetermined forced standard state in order to prevent incorrect synchronization in failure situations. Information about the failure is forwarded as described above by using the messages of the system. After information about the changed situation has been distributed through the system or over a sufficiently large area, the synchronization is reestablished around the point of change or possibly also at a greater distance, if required. The time periods ensure that information about the change will be distributed over a sufficiently large area. On detecting a change/failure, the node forwards information about it, starts its own timer and enters into a predetermined state. After the time period has expired, the node reverts to its normal procedures for obtaining timing, and the system starts to synchronize itself within areas which were affected by the change/failure. The arrangement according to the present invention is intended in particular for systems of the type disclosed in the aforementioned U.S. Pat. No. 2,986,723, a change occurring in the system appearing as a change in the synchronization signature entering the node. The standard state mentioned in the system disclosed in U.S. Pat. No. 2,986,723 is a state of internal timing, in which the node uses its own internal clock as the source of timing. The method disclosed in this patent will be referred to below as Self-Organizing Master-Slave synchronization (SOMS) and it will be used as an example in the detailed description of the invention.

As used in this text, the time period refers to a preset period of time intended to prevent the acceptance of faulty/outdated synchronization messages in the system.

In a system employing the SOMS synchronization method, a failure of a synchronization connection or of a node located centrally in the hierarchical structure causes the synchronization structure to break down in a part of the system. After the breakdown of the synchronization structure, part of the system nodes use their own internal clock for timing until the reestablishment of the synchronization structure is started. However, the internal clock of the node is usually inferior in quality to the master clock of the system. For this reason, the maintenance of the required quality is difficult in synchronization of larger systems in particular.

The above-described drawbacks have been alleviated with the method disclosed in Finnish Patent Application 925074 (filed on Nov. 9, 1992; secret at the moment the present application was filed). In this method, when the selected synchronization signature of the node deteriorates the node immediately selects this changed signature as its new synchronization signature and forcedly retains it for a preset time period at the most. The node thus enters into the state of forced timing and is forced to synchronize itself with a clock frequency of a signal from a neighboring node.

The basis for the present invention is such a situation of forced timing, in which a node has been forced to synchronize itself with a clock frequency of a signal from a neighboring node. It is not significant for the invention how this situation developed. The aforementioned Finnish patent application describes one manner, however, which is preferable since it speeds up resynchronization more than the known arrangements.

When a node has entered the state of forced timing as a result of a network failure and it has been forced to synchronize itself as described above with a clock frequency of a signal from a neighboring node, the selected signal (with which the node is forced to synchronize itself) may, however, become faulty for example due to a failure, or the synchronization signature may deteriorate (i.e. the corresponding signal or synchronization message is still of an acceptable quality, but the signature therein has a lower priority level than before.) During this forced timing, however, correct measures should be taken and correct decisions concerning synchronization should be made, so-that the network would be synchronized towards a stable state.

The purpose of the present invention is to eliminate the above-described problem, to speed up network synchronization and to prevent synchronization from getting in disorder in situations where the selected source fails or the signature it transmits deteriorates when the node is in the above-described state of forced timing. This purpose is achieved with the method according to the invention, the first embodiment of the invention being characterized by a hierarchical synchronization method for a telecommunications system employing message-based synchronization and comprising a plurality of nodes interconnected by transmission lines (A, B), wherein the nodes interchange signals containing synchronization message with a synchronization signature indicating the priority of the corresponding signal in the internal synchronization hierarchy of the system, and wherein the node is forced to enter into a predetermined standard state in a change situation, such as a failure situation, in order to prevent the selection of faulty synchronization messages. The method is characterized in that in a change situation the node enters into a state of forced timing where it has selected a synchronization signature received from a neighboring node and synchronized itself with the clock frequency of a signal from the neighboring node, whereupon the transition starts timer means for the forced state measuring a time period after the expiry of which the node enters again into the state of normal timing, whereupon when the selected synchronization signature changes in the state of forced timing, the new signature is accepted and the measurement of the time period of the forced state is restarted, and when the quality of the signal corresponding to the selected synchronization signature becomes inadequate for synchronization, the node enters into the predetermined standard state, preferably the state of internal timing, in order to prevent the selection of faulty synchronization signatures, and restarts the measuring of the forced state, whereupon the transition is performed at least whenever a signal is received from the neighboring node through only one transmission line.

In some embodiments, the method is characterized in that both a deterioration and improvement in the selected synchronization signature is considered as a change.

In some embodiments, the method is characterized in that only the deterioration of the selected synchronization signature is considered as a change, whereupon when the selected synchronization signature improves during the state of forced timing, the improved signature is immediately accepted for use and the timer means for the forced state is allowed to independently continue it operation.

In some embodiments, the method is characterized in that the quality of the signal corresponding to the selected synchronization signature is also considered inadequate when the value describing the distance in the synchronization signature on the highest priority level increases a predetermined number of times within a predetermined time period, while the parameter describing the original synchronization source in the synchronization signature remains the same, however.

In some embodiments, the method is characterized in that when the node is connected to the neighboring node through more than one transmission line and the quality of the signal corresponding to the selected synchronization signature becomes inadequate, a signal received from another transmission line is selected for monitoring.

In another aspect, this invention is a hierarchical synchronization method for a telecommunications system employing message-based synchronization and comprising a plurality of nodes interconnected by transmission lines (A, B), wherein the nodes interchange signals containing synchronization messages with a synchronization signature indicating the priority of the corresponding signal in the internal synchronization hierarchy of the system, and wherein the node is forced to enter into a predetermined standard state in a change situation, such as a failure situation, in order to prevent the selection of faulty synchronization messages. The method is characterized in that in a change situation, the node enters into a state of forced timing in which it has selected a synchronization signature received from a neighboring node and synchronized itself with the clock frequency of a signal from the neighboring node, whereupon this transition starts timer means for the forced state measuring a time period after the expiry of which the node enters again into the state of normal timing, when the selected synchronization signature deteriorates in the state of forced timing, the node compares the synchronization signature which deteriorated during the state of forced timing first with its own internal signature, whereupon
  (a) if the deteriorated signature is better, the node selects it as its new signature and restarts the measuring of the time period of the forced state, or
  (b) if the internal signature is better, the node enters into the state of internal timing and restarts the measuring of the time period of the forced state, and when the quality of the signal corresponding to the selected synchronization signature becomes inadequate for synchronization, the node enters into a predetermined standard state, preferably the state of internal timing, and restarts the measuring of the time period of the forced state, whereupon the transition is performed at least whenever a signal is received from the neighboring node through only one transmission line.

The idea of the invention is to take into account all further changes in a situation where a node is in the state of forced timing and synchronized with a clock frequency of a signal from a neighboring node. If the synchronization signature arriving from the neighboring node changes, the new signature is accepted and the state of forced timing is restarted. If, on the other hand, the neighboring node or the signal it transmits fails in the same situation, the node enters into a predetermined standard state, such as the state of internal timing, and the measuring of the time period for the forced state is started again. The aforementioned applies for at least such failure situations where there is only one transmission line to the neighboring node, i.e. there is no second transmission line through which (despite the failure of the other line) a synchronization signature of an acceptable quality could be received.

In the following, the invention and its preferred embodiments will be described in greater detail with reference to the examples according to FIGS. 3 to 8 in the accompanying drawings, in which FIG. 1 shows the general configuration of a system employing message-based synchronization when the system is in synchronization with the clock frequency of a master source, FIG. 2 shows the network of FIG. 1 when the mater source has failed.

Figure 3:
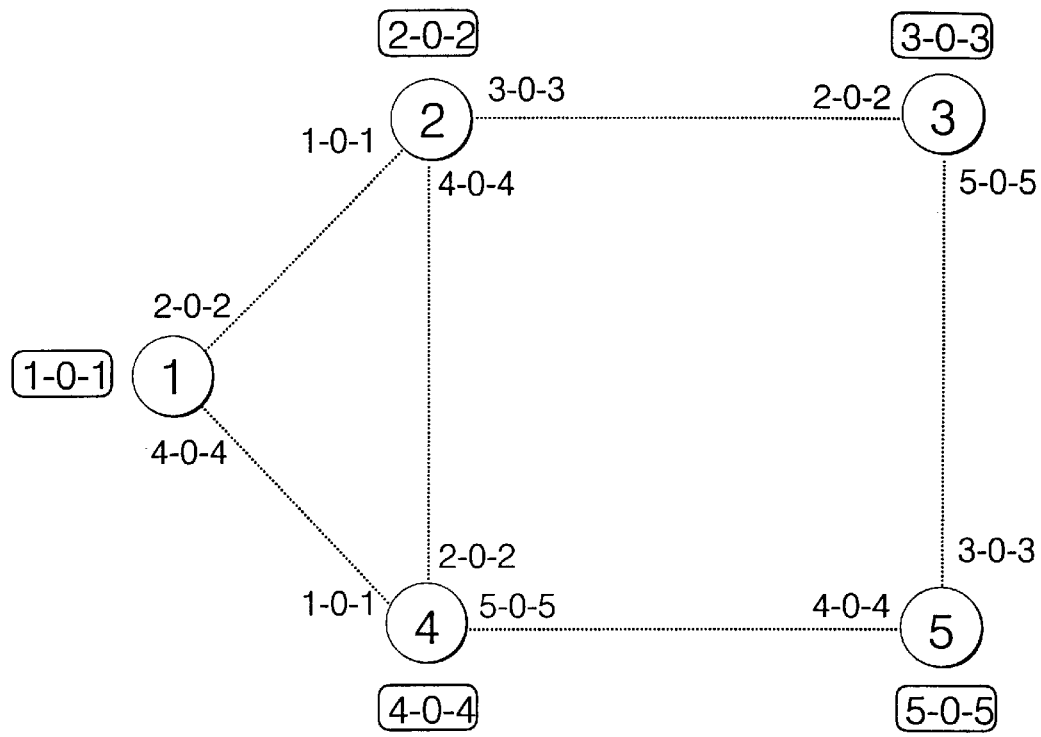
Figure 4:
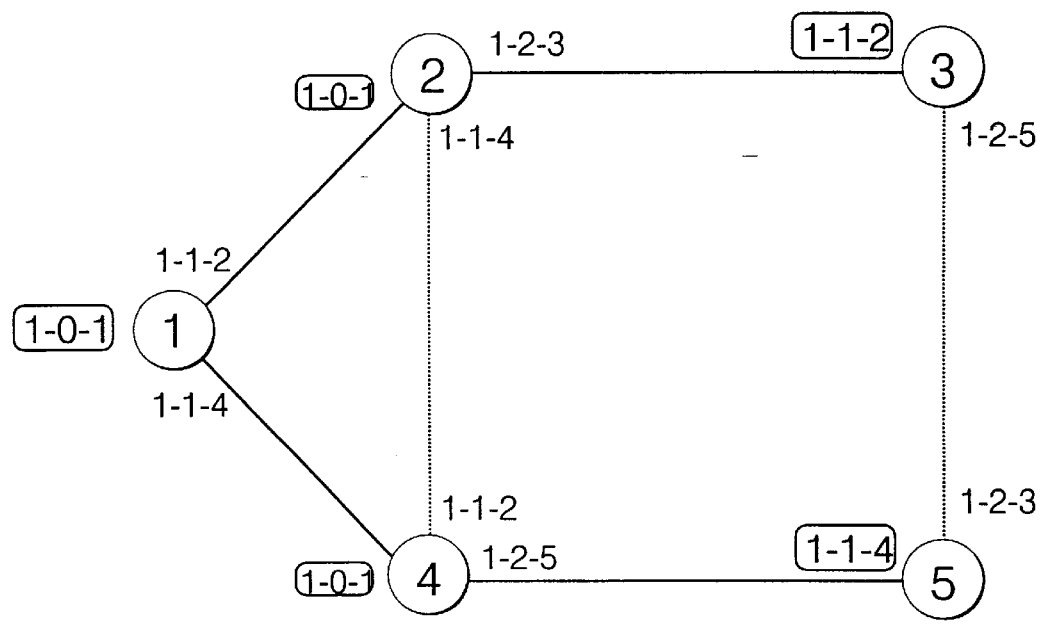
Figure 5:
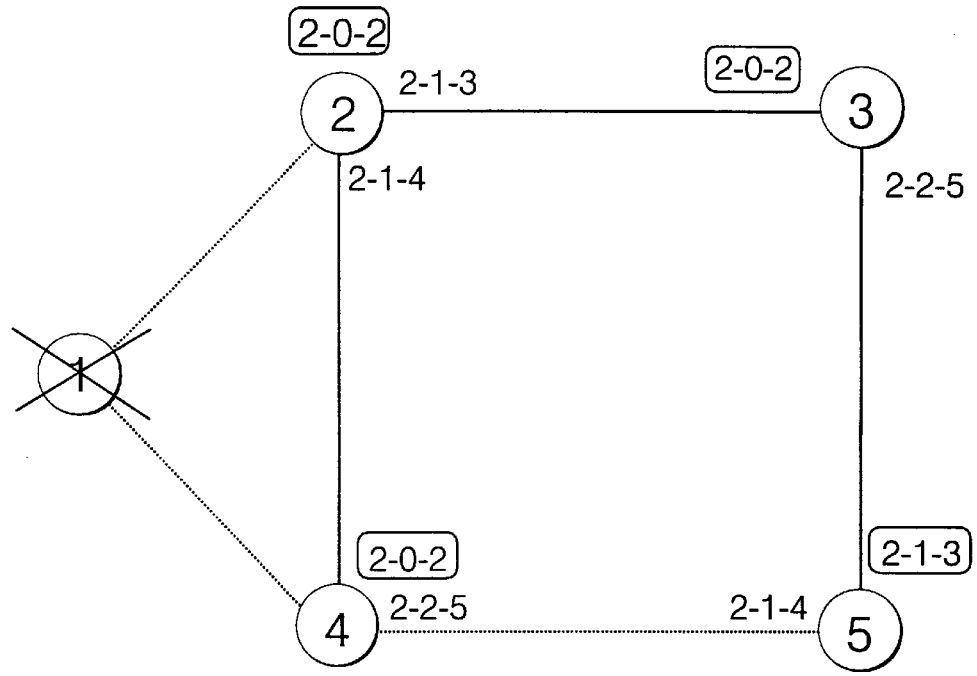
Figure 6:
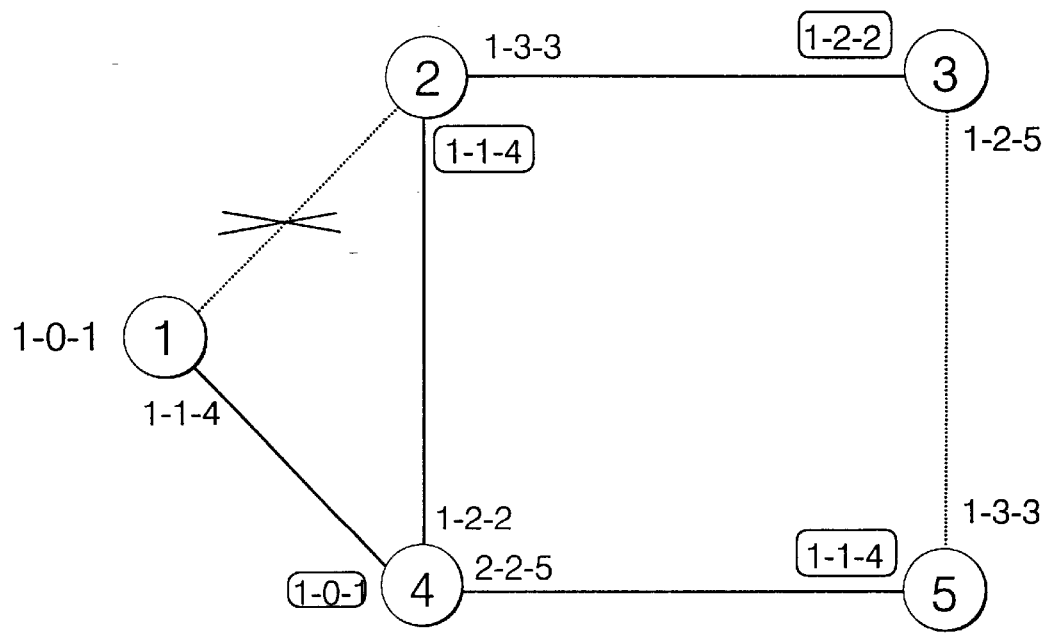
Figure 7A:
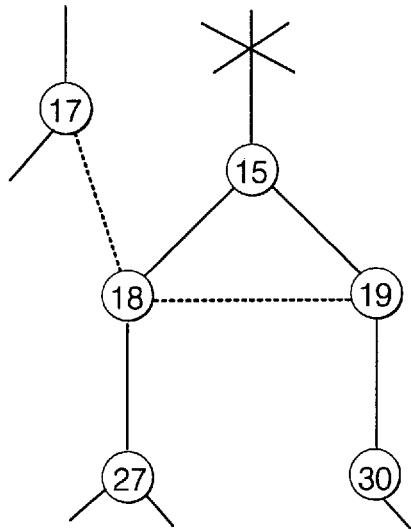
Figure 7B:
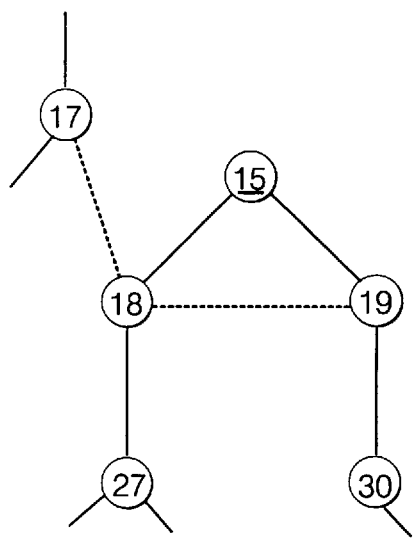
Figure 7C:
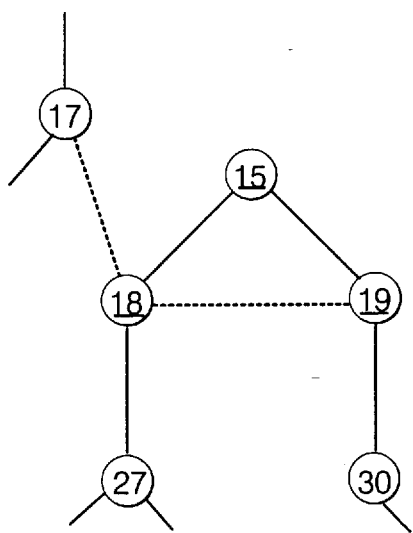
Figure 7D:
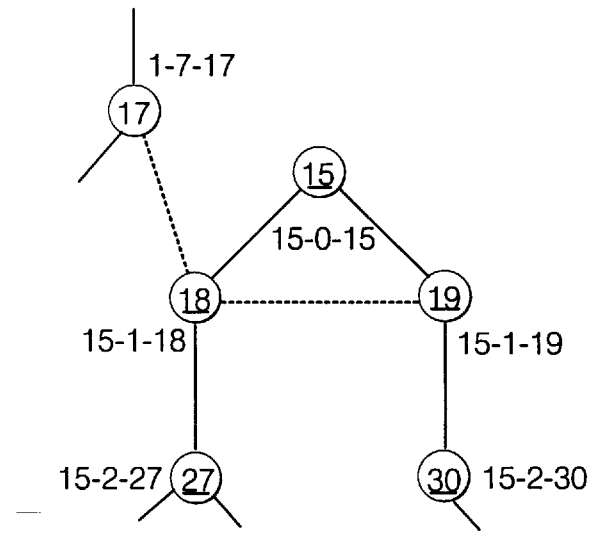
Figure 7E:
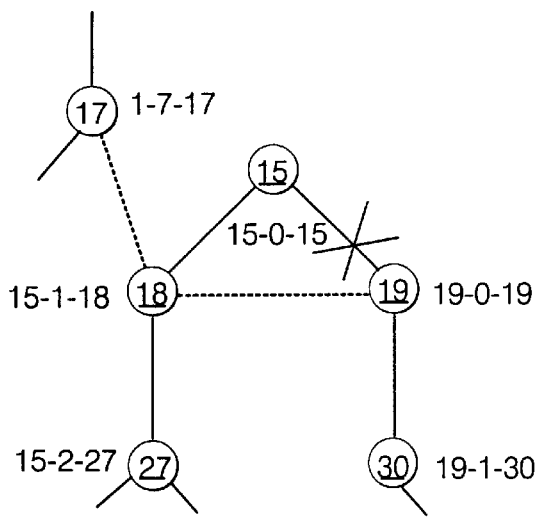
Figure 7F:
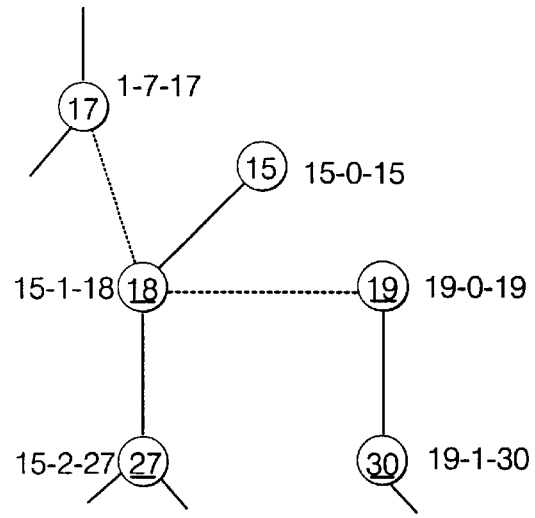
Figure 7G:
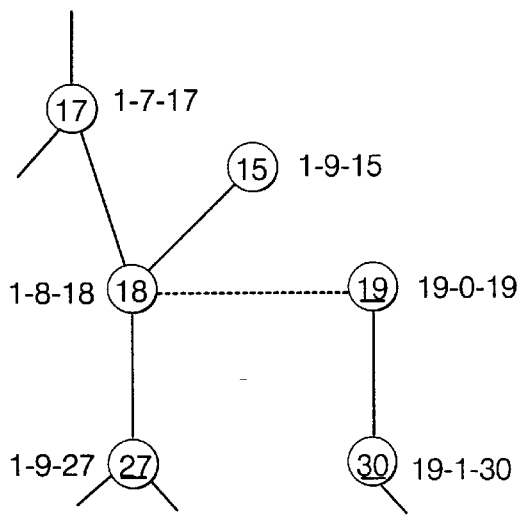
Figure 7H:
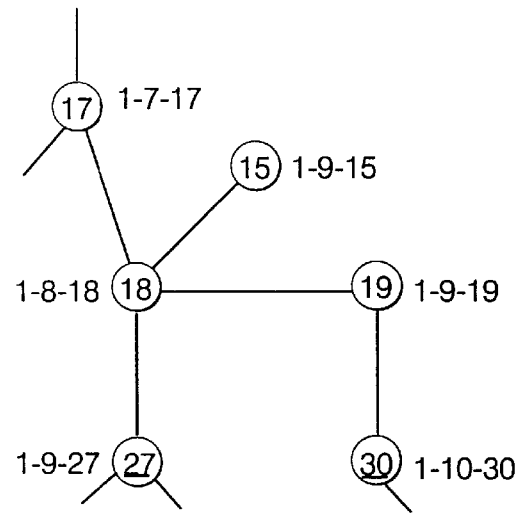
Figure 7I:
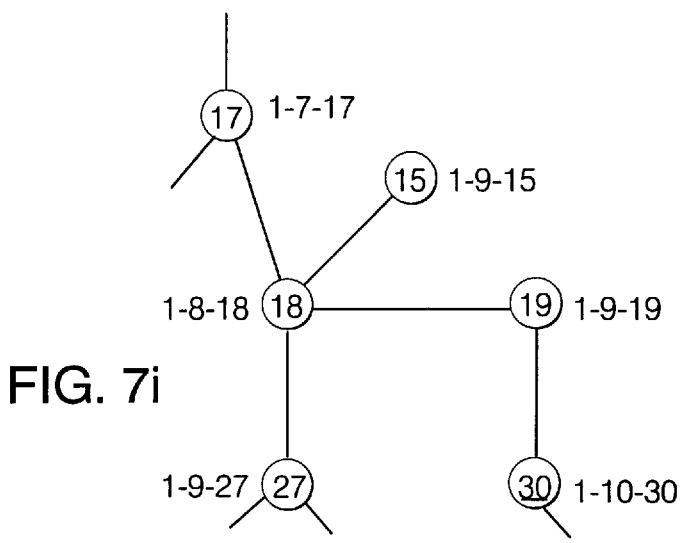
Figure 7J:
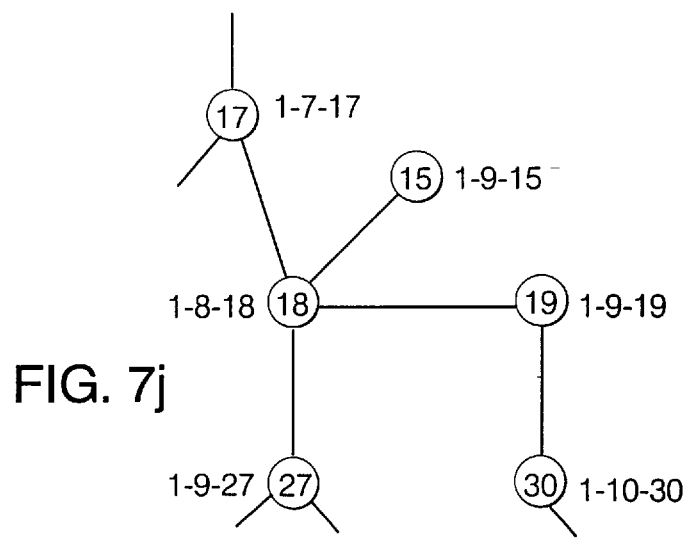
Figure 8:
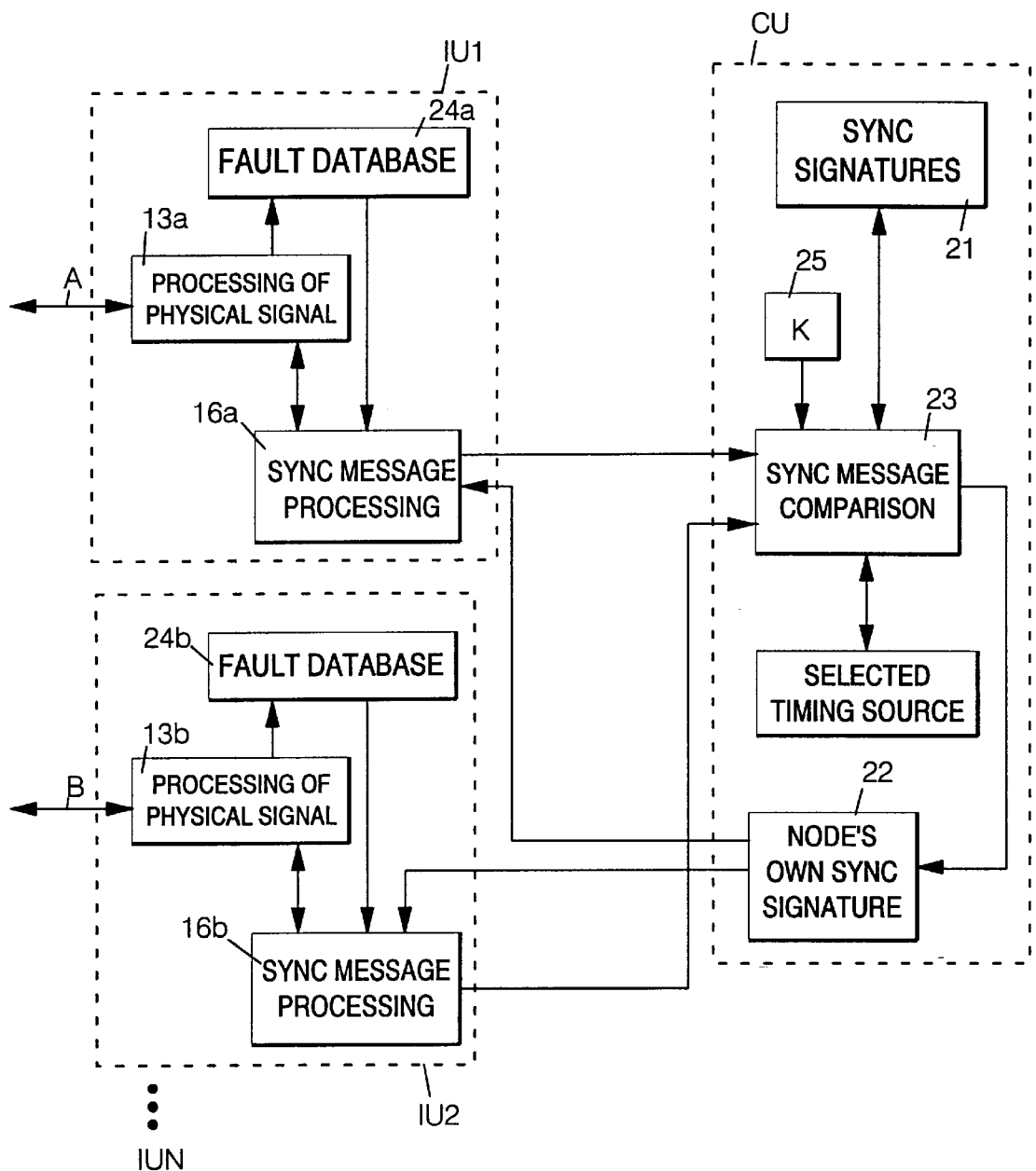

FIG. 3 shows a network employing self-organizing master-slave synchronization (SOMS) in an initial state, FIG. 4 shows the network of FIG. 3 in a stable state, FIG. 5 illustrates the resynchronization of the network of FIG. 4 when the master node has failed, FIG. 6 illustrates the resynchronization of the network of FIG. 4 when a connection between two nodes has failed, FIGS. 7a to 7j show a series of events describing the application of the method according to the invention in a SOMS system, and FIG. 8 shows means provided in each individual node for realizing the method according to the invention.

FIG. 3 illustrates a system employing self-organizing master-slave synchronization (SOMS), described in U.S. Pat. No. 2,986,723 referred to above. In this specific case, the system comprises five nodes (or devices) which are indicated by the reference numerals 1 . . . 5 according to their level of hierarchy. (Each number forms the SOMS address of the node, and the master node of the network has the smallest SOMS address.) The nodes interchange messages containing such SOMS addresses. In this way the nodes are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network a synchronization message contains three different parts: a frame structure, signature and check sum. The SOMS signature is the most important part of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a distance to a node indicated by D1. The distance is given as the number of intermediate nodes.

D3 is the SOMS address of a transmitting node.

Each node (or device) compares continuously incoming SOMS signatures with each other and selects the smallest amongst them. In the signature the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master code, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighboring nodes as its new synchronization source on the basis of an incoming SOMS signature, it has to regenerate its own (outgoing) SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way there will be no unnecessary delays in network changes.

Initially each node employs its own internal synchronization source, and transmits its own internal SOMS signature X-O-X to the other nodes. This signature is also compared with incoming SOMS signatures. If none of the incoming signatures is smaller than the internal signature, the node continues to use its own internal timing.

In FIG. 3, the SOMS network is shown in an initial state when none of the nodes (or devices) has yet processed any one of the incoming SOMS messages. In all nodes, the highest priority is assigned to the internal SOMS signature of the node as no other signatures have yet been processed. In FIG. 3, the SOMS signatures are indicated beside each node to which they are transmitted, and the selected signature is framed (in the initial situation shown in FIG. 3 all nodes employ their internal timing source). Lines used in synchronization are drawn by a continuous line and standby lines are drawn by a broken line (in the initial situation shown in FIG. 3, all lines are standby lines).

When the nodes start to process the incoming SOMS messages, node 1 retains the use of the internal timing, nodes 2 and 4 synchronize themselves with node 1 on the basis of the signature 1-0-1, node 3 is synchronized with node 2

(2-0-2), and node 5 with node 3 (3-0-3). At the same time the nodes generate their own new SOMS signatures as described above and provide their outgoing SOMS message with the new signature. The network in a stable situation is shown in FIG. 4. All nodes have synchronized with the master node 1 over the shortest possible path.

If the smallest one of the SOMS signatures entering the node changes or is lost totally when the connection fails, the node selects a new synchronization direction on the basis of the second smallest SOMS signature. Prior to this, however, the node is forced to change over to internal timing, which it retains for a preset time period in order for any faulty SOMS signatures occurring in the network to be eliminated. For instance, if node 1 in the situation of FIG. 4 should fail, nodes 2 and 4 would no longer receive the signature 1-0-1, with which they were synchronized. If they now accepted immediately the second smallest SOMS signature, the network would no longer be synchronized with a single master node but a synchronization loop would result. When node 1 fails, node 2 still receives the signatures 1-1-4 and 1-2-3, and node 4 receives the signatures 1-1-2 and 1-2-5, as nodes 3 and 5 have not yet responded to the changed situation. If the second smallest signatures were accepted immediately, node 2 would be synchronized with node 4, and node 4 with node 2. This situation is prevented by the above-mentioned forced state of internal timing, in which the nodes start to use their own internal timing source and transmit their own internal SOMS signature (X-O-X). Nodes which were synchronized with the node now in the state of internal timing detect that a change has occurred in the network and that the SOMS message on which the former synchronization was based is no longer valid as it has been changed into the internal SOMS message of the neighboring node. As a consequence, the outgoing SOMS message with the new signature. The network in a stable situation is shown in FIG. 4. All nodes have synchronized with the master node 1 over the shortest possible path.

If the smallest one of the SOMS signatures entering the node changes or is lost totally when the connection fails, the node selects a new synchronization direction on the basis of the second smallest SOMS signature. Prior to this, however, the node is forced to change over to internal timing, which it retains for a preset time period in order for any faulty SOMS signatures occurring in the network to be eliminated. For instance, if node 1 in the situation of FIG. 4 should fail, nodes 2 and 4 would no longer receive the signature 1-0-1, with which they were synchronized. If they now accepted immediately the second smallest SOMS signature, the network would no longer be synchronized with a single master node but a synchronization loop would result. When node 1 fails, node 2 still receives the signatures 1-1-4 and 1-2-3, and node 4 receives the signatures 1-1-2 and 1-2-5, as nodes 3 and 5 have not yet responded to the changed situation. If the second smallest signatures were accepted immediately, node 2 would be synchronized with node 4, and node 4 with node 2. This situation is prevented by the above-mentioned forced state of internal timing, in which the nodes start to use their own internal timing source and transmit their own internal SOMS signature (X-O-X). Nodes which were synchronized with the node now in the state of internal timing detect that a change has occurred in the network and that the SOMS message on which the former synchronization was based is no longer valid as it has been changed into the internal SOMS message of the neighboring node. As a consequence, the nodes also enter into the forced state of internal timing for a preset time period.

If the master node fails in the case of FIG. 4, the nodes 2 and 4 are immediately forced to enter into the state of internal timing when they lose the incoming SOMS signature 1-0-1. When the nodes 3 and 5 detect the change that has taken place in the nodes 2 and 4, they are also forced to enter into the state of internal timing. When node 2 reverts to the normal state, it receives the internal SOMS signatures (3-0-3 and 4-0-4) from the nodes 3 and 4 and retains the use of the internal timing as the SOMS signatures received from outside are not smaller than its own internal signature (2-0-2). Node 4 is then synchronized with node 2. After having stabilized, the network is in the state shown in FIG. 5, where node 2 is the new master node of the network. If for example only the connection between the nodes 1 and 2 breaks (FIG. 6), only node 2 is forced into the state of internal timing. On reverting to the normal state it synchronizes itself with node 4 having a connection to the master node of the network. After the stabilization of the entire network, the synchronization still originates from node 1 despite the break. This is illustrated in FIG. 6.

When a break or another change occurs in the upper portions of the synchronization tree (closer to the master source of the system) so that the synchronization signature of the current selected timing source entering the node deteriorates due to the loss of the old path to the master node of the system, it is possible that the node immediately selects the new, deteriorated synchronization signature of the selected timing source as the new synchronization signature. In other words, the node does not enter into the state of internal timing, as in the above-described prior art solution, but it is forced to synchronize itself with the clock frequency of a signal from a neighboring node. The node retains this changed signature for a preset time period at the most. This kind of arrangement is disclosed in the aforementioned Finnish Patent Application 925074, which is referred to for a more detailed description.

In order that the network synchronization could be speeded up and synchronization could be prevented from getting in disorder in this kind of a state of forced timing despite further changes in the selected synchronization signature, the node operates according to the invention in such a way that (a) when the selected synchronization signature changes in the aforementioned state of forced timing, the node accepts the new signature and starts to measure again the time period for the forced state, and (b) when the quality of the signal corresponding to the selected synchronization signature becomes inadequate for synchronization, the node enters into a predetermined standard state, preferably the state of internal timing, and starts to measure again the time period for the forced state.

The latter transition is performed at least whenever a signal from the aforementioned neighboring node is received via only one transmission line. If there are several transmission lines to the neighboring node, it is also possible to select a signal received from another transmission line and to check whether it is of adequate quality for synchronization. After this check-up the node proceeds as described above.

It should be mentioned that a signal is considered to be of inadequate quality for example when (a) the signal fails completely, (b) frame alignment is lost, or (c) the bit error ratio exceeds a predetermined limit, for example $10^{-3}$. According to a preferred embodiment of the invention, a situation where an outdated synchronization signature having the wrong synchronization status (possibly) remains in the network is also considered as a failure situation. This situation will be described in greater detail below.

FIGS. 7a to 7j show the procedural stages of an application of the method according to the invention in a SOMS system portion comprising nodes 15, 17, 18, 19, 27 and 30. Nodes in the forced state for the preset period are indicated by underlining the respective numbers, and connections used for synchronization are indicated by continuous lines.

At the first stage shown in FIG. 7a, a connection of node 15 towards the master node of the system fails. At the following stage (FIG. 7b), node 15 is forced to enter into the state of internal timing and starts to transmit its internal synchronization signature. The selected synchronization signature received at nodes 18 and 19 thereby deteriorates, and the nodes immediately select the changed signature as their new synchronization signature and generate on the basis of it a new outgoing signature of their own (FIG. 7c). Nodes 18 and 19 are forced to retain the new, changed signature for a preset time period before they are allowed to freely select the smallest (best) one amongst all incoming synchronization signatures. The forced automatic selection of the changed signature spreads in the synchronization tree downward without changing it. At the stage shown in FIG. 7d, this selection has reached nodes 27 and 30 (the outgoing signatures of the nodes are shown next to the nodes). If in this state for example the connection between nodes 15 and 19 fails, node 19 first detects the failure of the connection (FIG. 7e) and enters into the state of internal timing simultaneously starting the counting of the forced time period from the beginning. Node 30 receives the internal signature of node 19, and this signature is weaker than the signature of node 15. Node 30 immediately accepts the new signature while still retaining the forced state. Node 30 simultaneously starts again the counting of the forced timing. In FIG. 7f, the forced timing of node 15 has expired, but the node still retains the internal timing, since no better source is available. At the next stage (FIG. 7g), the forced timing of node 18 is over and the node synchronizes itself with node 17. Node 15 receives the new signature of node 18 and synchronizes itself with this. Node 27 still retains the forced timing, but it immediately accepts the improved signature of node 18 without affecting the operation of the timer for the forced state (a preferred embodiment described below). In FIG. 7h, the forced timing of node 19 is over and the node synchronizes itself with node 18. Node 30 immediately accepts the new signature of node 19, starting again the counting of the forced timing. In this exemplary case, node 30 thereby utilizes a different embodiment of the invention than node 27, which did not affect the operation of the timer for the forced state. At the last two stages (FIGS. 7i and 7j), the state of forced timing is over for nodes 27 and 30, but the synchronization situation no longer changes. Since nodes 27 and 30 utilize different embodiments, the state of forced timing of node 27 is over (FIG. 7i) clearly before that of node 30 (FIG. 7j).

FIG. 8 shows means provided in each node for realizing the method according to the invention. The general structure of the node comprises several parallel interface units IU1, IU2 . . . IUN each of which is connected to a neighboring node, and a control unit CU which is shared by all interface units and which is the location of decision-making concerning the synchronization. The figure shows two transmission connections A and B between a system node and neighboring nodes, both connections being connected to their own interface unit. The transmission connections are typically for example PCM lines of 2 Mbit/s complying with the CCITT recommendations G.703 and G.704, or SDH lines according to the recommendations G.708 and G.709. Synchronization messages can be transmitted in different ways in such signals; one example is disclosed in the co-pending Finnish Patent Application 940926 which also describes the general architectural models of the node.

The transmission line of each connection is connected to a signal transmission and reception means 13a and 13b, respectively, which process the physical signal. The means 13a and 13b forward the synchronization message to an associated synchronization message transmission and reception means 16a and 16b, respectively. The transmission and reception means 16a and 16b for example check whether the message is faultless and forward the message to a centralized node synchronization decision means 23 having a respective input connected to the output of the respective transmission and reception means 16a, 16b. The signal transmission and reception means 13a and 13b also supervise the quality of the received signal and store information thereon into interface-specific fault databases 24a and 24b, respectively. The synchronization message transmission and reception means 16a obtains fault data from the database 24a and the transmission and reception means 16b from the fault database 24b, respectively. The signal transmission and reception means monitor failures/changes in the connection in a manner known per se.

The decision means 23 of the control unit CU compares the messages and stores them in a memory 21, e.g. in priority order so that the selected synchronization signature always has the highest status. The decision means also receives the fault data of a signal from the corresponding interface unit in the form of a synchronization message or as separate fault data. When the decision means judges from the supplied data that the node has to enter into the standard state for the preset time period, it selects the source of its timing as defined in the applied synchronization method for this kind of situation; it applies an appropriate synchronization signature to the interface-specific synchronization message transmission and reception means 16a and 16b from a memory 22 (where it generates an outgoing signature used in each particular case), and starts a timer means 25. The node informs the neighboring nodes about the change that has occurred by transmitting the new signature. When the timer means 25 indicates that the preset time period K has expired, the decision means 23 is again allowed to select the source of timing according to a normal procedure.

When the decision means 23 receives a deteriorated synchronization message from the message transmission and reception means corresponding to the selected synchronization signature, it starts the timer means 25, selects the deteriorated signature and generates on the basis of it its own new synchronization signature, which it applies from the memory 22 to the synchronization message transmission units of all interface units.

When the node is thus in the state of forced timing and the decision means 23 receives a new signature or fault data from one of the interface units, it processes the aforementioned signature/fault data in a normal manner and, if required, changes the synchronization list stored in the memory 22 to correspond to the new situation. After this the decision means checks whether the signal received from the timing source used in the forced state is in order.

If the signal is still in order (it is of adequate quality for synchronization) but its signature has deteriorated, the node retains this old source, whereupon the decision means updates the node's own synchronization signature stored in the memory 22 to correspond to the changed received signature, applies the new signature from the memory 22 to the synchronization message transmission units of all interface units, and starts the timer means 25 to measure the state of forced timing again from the beginning.

If the source used in this state of forced timing (or a corresponding transmission connection) is no longer in order, however (i.e. the quality of the corresponding signal is no longer adequate for synchronization), the node enters into the state of internal timing, whereupon the decision means 23 updates into the memory 22 the node's internal synchronization signature, applies the internal signature to the synchronization message transmission units of all interface units, and starts again the timer means 25 to measure the state of forced timing from the beginning. The internal synchronization signature can also be applied to the interface units from a separate storage location.

In the first embodiment of the invention, both a deterioration and improvement in the selected synchronization signature is considered as a change. Thus in a situation where a synchronization signature improves during the state of forced timing, the timing of the force state is also restarted.

In the second embodiment of the invention, only the deterioration of the selected synchronization signature is considered as a change, whereupon if the selected synchronization signature improves during the aforementioned state of forced timing, the node directly accepts it for use and updates the outgoing signature accordingly. In this case the time period of the forced timing is not restarted, but the timer means are allowed to independently continue their operation. This second embodiment speeds up the system synchronization further.

According to another embodiment of the invention, a failure situation is also a situation (as described above) where the old synchronization signature keeps on circulating in the network, whereupon the node enters into the state of internal timing in the above-described manner, the outgoing signature is changed to correspond to the internal timing, and the time period for the forced timing is restarted. Such a failure situation is detected in such a way that the node monitors both the distance parameter (in a SOMS network the second part D2 of the signature) contained in the synchronization signature of. the source in the highest place on the priority list, the parameter describing the distance to the master source of timing, and the parameter describing the original synchronization source contained in said synchronization signature (in a SOMS network the first part D1 of the signature). The node changes over to the state of internal timing and the time period of forced timing is started if the value describing the distance increases a required number of times in succession during a short time, while the parameter describing the original synchronization source remains the same during this short time period. Such an arrangement is described in greater detail in the co-pending Finnish Patent Application 940926, which is referred to for a closer description. The latter arrangement may thus be used in networks in which the synchronization signature contains in some form data about the distance to the network master clock and about the original timing source, and in which the node uses this data as a selection criterion (possibly together with the quality parameter indicating the original timing source). For example the SOMS method fulfills these requirements.

According to another embodiment of the invention, the node compares the synchronization signature which deteriorated during the state of forced timing first to its own internal signature and then selects the better alternative. The comparison is performed in the decision means 23. If the internal signature is better, the node enters into internal timing in a manner known per se, and if the deteriorated signature is better, the node selects it as its new signature as described above. In each case the state of forced timing is restarted.

Even though the invention is described above with reference to the examples according to the accompanying drawings, it is clear that the invention is not restricted thereto, but it may be modified within the inventive idea disclosed above and in the appended claims. Even though the SOMS system has been used as an example above, the solution according to the invention is applicable in all similar systems where a change in the system appears as a change in the synchronization message entering the node. Even though an embodiment using only one timer means and one time period for all transitions is described above, in principle each state may have a different time period or even its own timer means, whereupon the timer means dominant in a particular situation determines the operation of the node, and the expiry of the time periods of other timer means brings about no actions. When the appended claims disclose restarting the measuring of the forced time period, it must also be understood as covering these alternatives. The above-described embodiment (one timer and the same time period) is, however, the simplest and therefore also the most preferable. The predetermined standard state (which is preferably the state of internal timing) into which the node enters when the quality of the signal corresponding to the selected synchronization signature becomes inadequate for synchronization may be varied depending for example on the synchronization method used. In such a standard state, for example a fixed external timing source can be selected for the time period.

I claim:

1. A method of hierarchical synchronization for a telecommunications system employing message-based synchronization, the system comprising a plurality of nodes interconnected by transmission lines, wherein the nodes interchange signals containing synchronization messages each having a synchronization signature indicating a priority of the corresponding signal in an internal synchronization hierarchy of the system, and wherein a node is forced to enter into a predetermined standard state in a change situation in order to prevent the selection of faulty synchronization messages, the method comprising:

(A) in a change situation,
  (a1) the node entering into a state of forced timing where it has selected a synchronization signature received from a neighboring node and synchronized itself with a clock frequency of a signal from the neighboring node, and upon transition to the state of forced timing,
  (a2) measuring a time period with a timer, and then, after expiry of the time period,
  (a3) the node entering into a state of normal timing, and
(B) when the selected synchronization signature changes while in said state of forced timing,
  (b1) accepting the signature, and
  (b2) restarting measurement of the time period of the forced state, and
(C) when a quality of the signal corresponding to the selected synchronization signature becomes inadequate for synchronization,
  (c1) the node entering into the predetermined standard state in order to prevent the selection of a faulty synchronization signature, and
  (c2) restarting the measuring of the time period of the forced state,
wherein a transition is performed at least whenever a signal is received from said neighboring node through only one transmission line.

2. A method according to claim 1, wherein both a deterioration and an improvement in the selected synchronization signature are considered to be change situations.

3. A method according to claim 1, wherein only deterioration of the selected synchronization signature is considered to be a change, the method further comprising, when the selected synchronization signature improves during said state of forced timing, immediately accepting said improved signature for use and allowing the timer for the forced state to independently continue its operation.

4. A method according to claim 1, wherein the quality of the signal corresponding to the selected synchronization signature is considered inadequate when a value describing a distance in the synchronization signature on the highest priority level increases a predetermined number of times within a predetermined time period, while a parameter describing the original synchronization source in the synchronization signature remains unchanged.

5. A method according to claim 1, further comprising:

selecting for monitoring a signal received from another transmission line when the node is connected to said neighboring node through more than one transmission line and the quality of the signal corresponding to the selected synchronization signature becomes inadequate.

6. A method of hierarchical synchronization for a telecommunications system employing message-based synchronization and comprising a plurality of nodes interconnected by transmission lines, wherein the nodes interchange signals containing synchronization messages having a synchronization signature indicating the priority of the corresponding signal in an internal synchronization hierarchy of the system, and wherein a node is forced to enter into a predetermined standard state in a change situation in order to prevent the selection of a faulty synchronization messages, the method comprising:

(A) in a change situation,
- (a1) the node entering into a state of forced timing in which it has selected a synchronization signature received from a neighboring node and synchronized itself with the clock frequency of a signal from the neighboring node, and, upon this transition,
- (a2) starting a timer for the forced state and measuring a time period with the timer, and after the expiry of the time period,
- (a3) the node entering into a state of normal timing;

(B) when the selected synchronization signature deteriorates while in said state of forced timing,
- (b1) the node comparing the synchronization signature which deteriorated during the state of forced timing first with its own internal signature, and
  - (b2a) if the deteriorated signature is better than the internal signature, the node selecting the deteriorated signature it as its new signature and restarting the measuring of the time period of the forced state, and
  - (b2b) if the internal signature is better than the deteriorated signature, the node entering into the state of internal timing and restarting the measuring of the time period of the forced state, and (C) when the quality of the signal corresponding to the selected synchronization signature becomes inadequate for synchronization, the node entering into the predetermined standard state and restarting the measuring of the time period of the forced state, whereupon the transition is performed at least whenever a signal is received from said neighboring node through only one transmission line.

7. A method as in claim 6 wherein the predetermined standard state is preferably the state of internal timing.

* * * * *